United States Patent [19]
Tanaka

[11] Patent Number: 5,182,660
[45] Date of Patent: Jan. 26, 1993

[54] BACK-LIGHT TYPE LIQUID CRYSTAL DISPLAY

[75] Inventor: Osamu Tanaka, Higashiosaka, Japan

[73] Assignee: Rohm Co., Ltd., Kyoto, Japan

[21] Appl. No.: 724,791

[22] Filed: Jul. 2, 1991

[30] Foreign Application Priority Data

Aug. 3, 1990 [JP] Japan ............................ 2-83038[U]
Aug. 3, 1990 [JP] Japan ............................ 2-83040[U]

[51] Int. Cl.⁵ .................. G02F 1/1335; G02F 1/1333
[52] U.S. Cl. ...................................... 359/49; 359/50; 359/83
[58] Field of Search .................... 359/83, 49, 50

[56] References Cited

U.S. PATENT DOCUMENTS

| | | | |
|---|---|---|---|
| 4,755,035 | 7/1988 | Kopish et al. | 359/83 |
| 4,772,100 | 9/1988 | Suenaga | 359/83 |
| 4,789,224 | 12/1988 | Bougsty | 359/83 |
| 4,878,738 | 11/1989 | Hanami | 359/83 |

FOREIGN PATENT DOCUMENTS 63-324  1/1988 Japan .
2-13924 1/1990 Japan .
2-39211 3/1990 Japan .

Primary Examiner—William L. Sikes
Assistant Examiner—Anita Pellman Gross
Attorney, Agent, or Firm—William H. Eilberg

[57] ABSTRACT

A liquid crystal display includes a fixing frame having a display window, a liquid crystal panel device received in the frame in facing relation to the window, and a back lighter received in the frame and stacked to the panel device on the side thereof away from the window. The back lighter has a light guide having a marginal edge provided with a fluorescent lamp which is arranged outwardly of a corresponding marginal edge of the panel device and offset toward the panel device, so that the lamp does not project beyond the rear surface of the light guide.

12 Claims, 5 Drawing Sheets

BACK-LIGHT TYPE LIQUID CRYSTAL DISPLAY

BACKGROUND OF THE INVENTION

1. Field of the Invention

This invention relates generally to liquid crystal displays wherein a liquid crystal panel device, which comprises a pair of transparent plates for sealing holding a liquid crystal therebetween, is retained by a fixing frame. More specifically, the present invention relates to a liquid crystal display of the type which incorporates a back lighter for illuminating a liquid crystal panel device from behind.

2. Description of the Prior Art

As is well known, back-light type liquid crystal displays are widely used in portable word processors or computers. Obviously, this type of liquid crystal display should be as thin as possible in order to reduce overall size and weight. Thus, various attempts have been made to reduce the thickness of the display.

FIGS. 11 through 15 of the accompanying drawings show an example of prior art back-light type liquid crystal display which has resulted from such an attempt.

As shown in FIGS. 11 through 15, the prior art display comprises a fixing frame 1 having a front wall 1a formed with a display window 1b. The fixing frame also has a rectangularly annular peripheral wall 1c formed with engaging pawls 1d. The frame accommodates a liquid crystal panel device 2 with a set of elastic buffer strips 3a, 3b, 3c interposed between the front wall 1a and the panel device 2. The frame further accommodates a back lighter 4 behind the panel device with another set of elastic buffer strips 5a, 5b, 5c interposed between the panel device and the back lighter A third set of elastic buffer strips 7a, 7b, 7c are interposed between the back lighter and a rear lid 6, and the engaging pawls 1d are inwardly bent to engage the lid (FIGS. 14 and 15) for fixedly retaining the panel device and the back lighter relative to the fixing frame.

The panel device 2 comprises front and rear transparent plates 2a, 2b between which a liquid crystal (not shown) is sealingly held. The panel device further includes circuit boards 2c, 2d, 2e bonded respectively via film-like connectors 2f, 2g, 2h. The circuit boards carry electronic components (not shown) for driving the display.

The back lighter 4 includes a flat light guide consisting of a transparent plate 4a and a light shielding layer 4c formed on the rear surface of the transparent plate. The back lighter further includes a pair of fluorescent lamps 4b arranged at two sides of the light guide.

With the prior art arrangement described above, each fluorescent lamp 4b has a central axis coinciding with the thickness center of the light guide, so that the lamp projects beyond the rear surface of the light guide when the diameter D (see FIG. 15) of the lamp is larger than the thickness of the light guide. Further, the lamp 4b is located inwardly of the marginal portion of the panel device 2. Thus, even if the thickness of the light guide is rendered small, the panel device 2 must be spaced from the rear lid 6 at least by a distance which is larger than the diameter D of the lamp. As a result, the overall thickness H of the display is inevitably increased, and the weight of the display is also increased correspondingly.

SUMMARY OF THE INVENTION

It is, therefore, an object of the present invention to provide a back-light type liquid crystal display which may be rendered very small in overall thickness and weight.

Another object of the present invention is to provide a back-light type liquid crystal display which has a reduced number of components and can be manufactured easily at a low cost while also realizing an additional decrease in overall thickness and weight.

According to one aspect of the present invention, there is provided a liquid crystal display comprising: a fixing frame having a display window; a liquid crystal panel device received in the frame, the panel device including front and rear transparent plates between which a liquid crystal is sealingly arranged; and a back lighter received in the frame and stacked to the panel device on the side thereof away from the window, the back lighter including a light guide which has at least one marginal edge provided with a fluorescent lamp; wherein the lamp is located outwardly of a corresponding marginal edge of the panel device, the lamp being arranged offset toward the panel device in a manner such that the lamp does not projects beyond a rear surface of the light guide.

With the arrangement described above, the lamp is located clear of the panel device and does not project beyond the rear surface of the light guide, so that the diameter of the lamp does not add to the overall thickness of the display. Thus, the display can be correspondingly reduced in thickness and weight.

Preferably, the display further comprises first bonding means interposed between the frame and the panel device for adhesive attachment thereto, and second bonding means interposed between the panel device and the back lighter for adhesive attachment thereto. According to this preferred arrangement, no rear lid need be provided, and the frame need have no engaging pawl, so that the display having a reduced number of components can be assembled very easily at a low cost.

According to another aspect of the present invention, there is provided a liquid crystal display comprising: a fixing frame having a front wall formed with a display window, the frame also having a peripheral wall; a liquid crystal panel device received in the frame, the panel device having a marginal edge spaced from the peripheral wall to define an accommodating space between the marginal edge and the peripheral wall; and a back lighter received in the frame and stacked to the panel device on the side thereof away from the window for illuminating the panel device from behind; wherein the back lighter includes at least one light source arranged to project into the accommodating space.

Other objects, features and advantages of the present invention will be fully understood from the following detailed description of the preferred embodiments given with reference to the accompanying drawings.

DETAILED DESCRIPTION OF THE PREFERRED EMBODIMENTS

Figure 1:
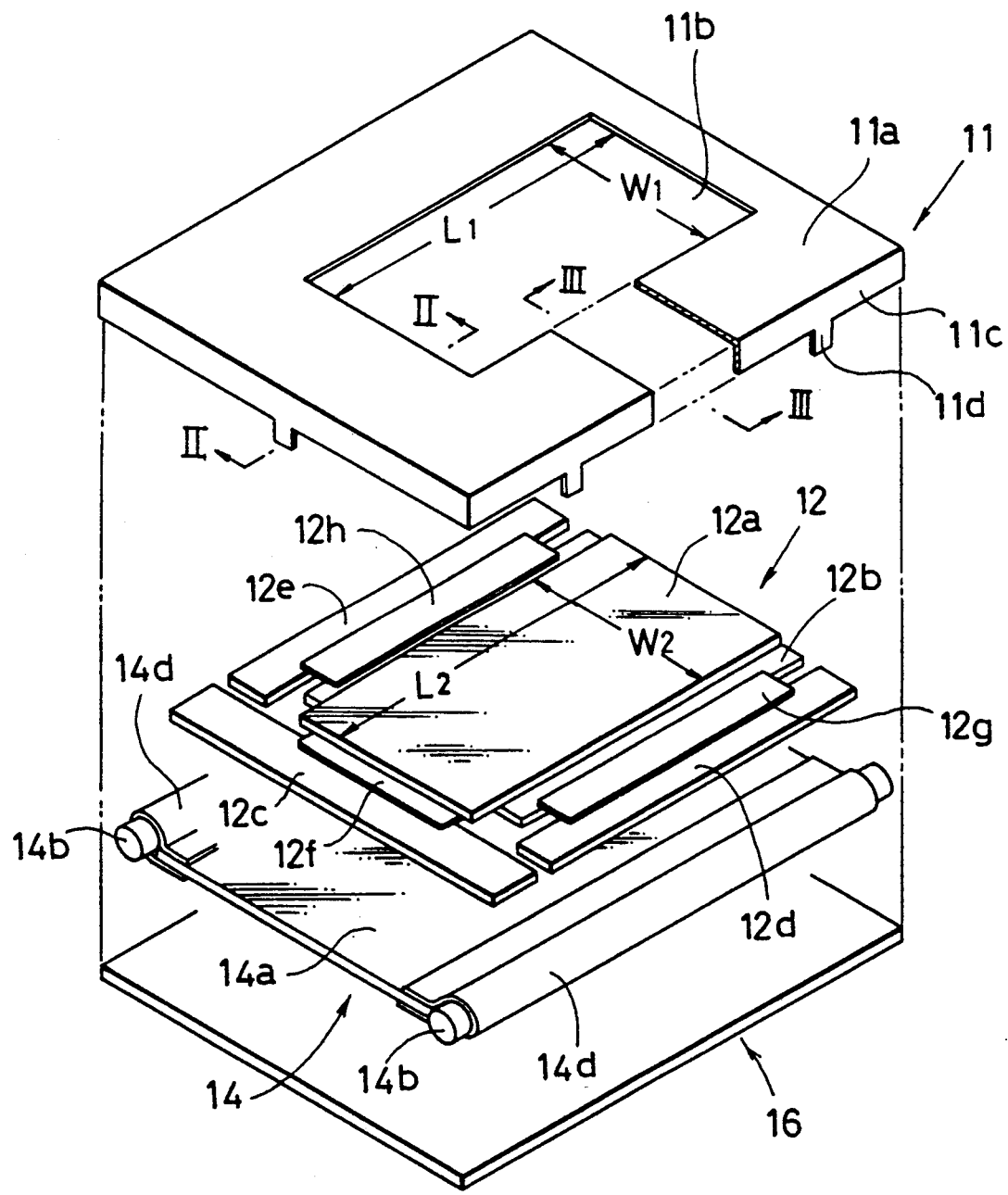
FIG. 1 is an exploded perspective view showing a liquid crystal display embodying the present invention.
Figure 2:
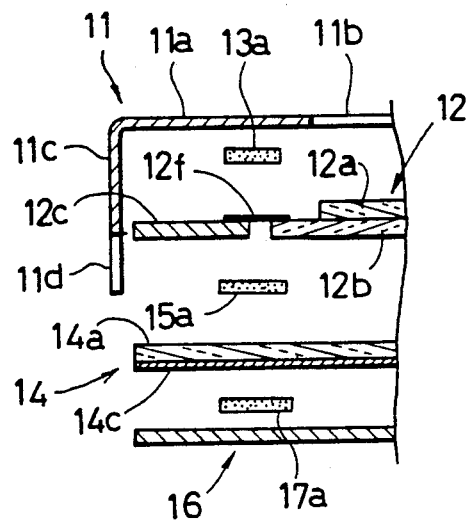
FIG. 2 is a fragmentary sectional view taken along lines II—II in FIG. 1.

Referring now to FIGS. 1 through 5 showing a first embodiment of the present invention, a liquid crystal display is shown to comprise three main components. These main components include a fixing frame 11, a liquid crystal panel device 12, a back lighter 14, and a rear lid 16.

The fixing frame 11, which is made of a metal for example, has a front wall 11a having a rectangular window 11b of predetermined length L1 and width W1. The frame further has a rectangularly annular peripheral wall 11c formed with a plurality of engaging pawls 11d. The frame works as a housing for accommodating the components to be described hereinafter.

The liquid crystal panel device 12 comprises front and rear transparent plates 12a, 12b between which is hermetically held a liquid crystal (not shown). Both transparent plates may be made of glass for example. The panel device further includes three circuit boards (two longitudinal and one transverse) 12c, 12d, 12e arranged adjacent to three sides of the rear transparent plate 12b in flush therewith within the fixing frame 11. The respective circuit boards carry electronic components (not shown) for driving the display, and are connected to the rear transparent plate 12b via film-like connectors 12f, 12g, 12h.

Figure 4:
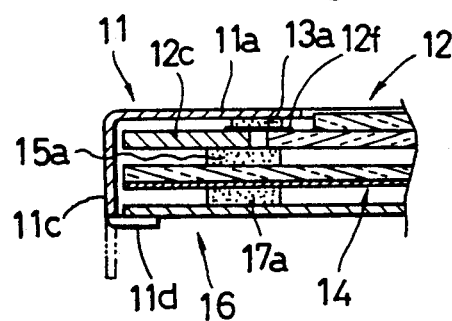
FIG. 4 is a fragmentary sectional view corresponding to FIG. 2 but showing the display in an assembled state.
Figure 5:
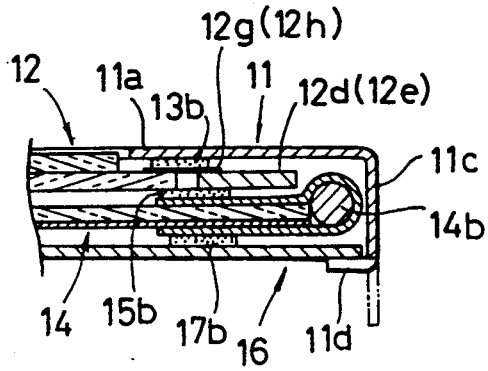
FIG. 5 is a fragmentary sectional view corresponding to FIG. 3 but showing the display in an assembled state.

According to the illustrated embodiment, the front transparent plate 12a of the liquid crystal panel device 12 has length L2 and width W2 slightly smaller than those of the frame window 11b, respectively. Thus, when assembled, the front transparent plate 12a is fitted in the frame display window 11b, as shown in FIGS. 4 and 5.

The back lighter 14 includes a light guide consisting of a transparent plate 14a and a light shielding layer 14c provided on the rear surface of the transparent plate 14a. The transparent plate 14a may be made of acrylic resin for example. The back lighter further includes fluorescent lamps 14b arranged along the respective longitudinal margins of the light guide. Each lamp 14b is partially enclosed in a light shielding film 14d which is also used to attach the lamp to the corresponding longitudinal margin of the light guide. Preferably, the lamp is of the aperture tube type which is designed to emit light locally from one circumferential portion of the tube into the light guide.

According to the illustrated embodiment, each fluorescent lamp 14b is located laterally outwardly of the corresponding longitudinal circuit board 12d (or 12e) of the liquid crystal panel device 12. Further, the fluorescent lamp is offset toward the liquid crystal panel device 12 so that the lamp does not project beyond the rear surface of the light guide, i.e., the rear surface of the light shielding layer 14c. In other words, the lamp projects into the space between the longitudinal circuit board and the peripheral wall 11c of the frame 11, as shown in FIG. 5.

Figure 3:
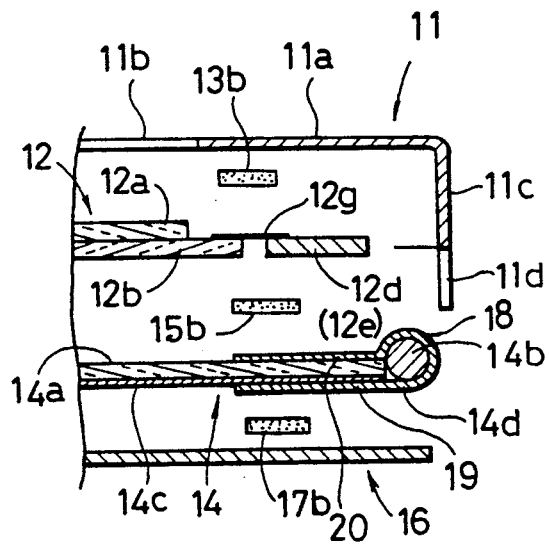
FIG. 3 is a fragmentary sectional view taken along lines III—III in FIG. 1.

As shown in FIG. 3, the light shielding film 14d for each fluorescent lamp 14b has an enclosing portion 18 for accommodating the lamp, and a pair of legs 19, 20 extending from the enclosing portion for attachment to the light guide. One leg 19 located away from the liquid crystal panel device 12 extends tangentially to the enclosing portion 18 because of the above-mentioned offset, whereas the other leg 20 extends non-tangentially to the enclosing portion.

In assembly, the liquid crystal panel device 12, the back lighter 14 and the rear lid 16 are arranged in stack. A set of buffer strips 13a, 13b are interposed between the frame front wall 11a and the panel device 12, whereas another set of buffer strips 15a, 15b are sandwiched between the panel device 12 and the back lighter 14. A further set of buffer strips 17a, 17b are arranged between the back lighter and the rear lid 16, and the engaging pawls 11d of the frame 11 are bent inwardly to engage the underside of the lid to fixedly retain the panel device and the back lighter within the frame. All buffer strips may be made of silicone rubber for example.

With the arrangement described above, each fluorescent lamp 14b overlaps the panel device 12 in the thickness direction of the liquid crystal display without projecting beyond the rear surface of the light guide (light shielding layer 14c). Thus, the diameter of the lamp is not added to the overall thickness of the display, thereby making the back-light type display thinner and lighter.

Figure 6:
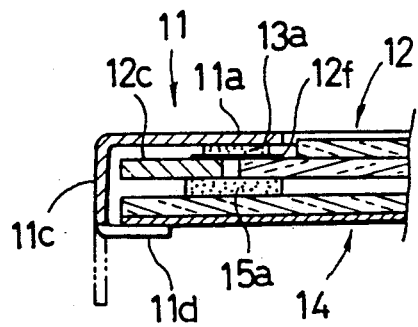
FIGS. 6 and 7 are fragmentary sectional views respectively similar to FIGS. 4 and 5 but showing another liquid crystal display embodying the present invention.
Figure 7:
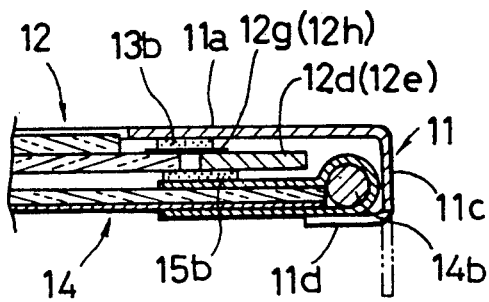

FIGS. 6 and 7 shows a second embodiment which differs from the first embodiment only in the following respects.

In the second embodiment of FIGS. 6 and 7, the rear lid 16 provided for the first embodiment and the buffer strips 17a, 17b associated with the lid are omitted. Instead, the engaging pawls 11d of the frame 11 are bent to engage directly with the underside of the back lighter 14. Such an arrangement is possible because the fluorescent lamps 14b are located offset (as previously described) to make the underside of the back lighter 14 substantially flat.

Obviously, the second embodiment is advantageous in reducing the total number of components and thereby making the display even thinner and lighter. Further, the second embodiment is also desirable in that each fluorescent lamp 14b is supported by the engaging pawls 11d against dislocating downward under it own weight.

Figure 8:
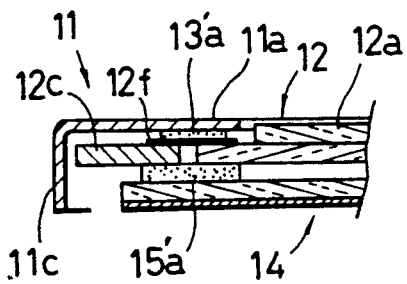
FIGS. 8 and 9 are fragmentary sectional views respectively similar to FIGS. 4 and 5 but showing a further liquid crystal display embodying the present invention.
Figure 9:
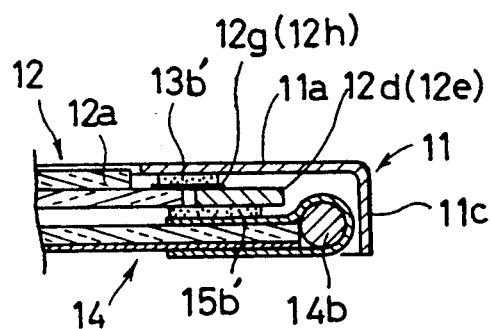

FIGS. 8 and 9 show a third embodiment which is similar to the second embodiment but differs therefrom only in the following points.

According to the third embodiment, the frame 11 has no engaging pawl. Instead, the liquid crystal panel device 12 is attached to the front wall 11a of the frame by a set of buffer strips 13a', 13b' which are rendered adhesively bondable on both faces. Similarly, the back lighter 14 is attached to the panel device 12 by another set of buffer strips 15a', 15b' which are rendered adhesively bondable on both faces.

Each of the buffer strips 13a', 13b', 15a', 15b' may comprise an elastic film having both faces coated with pressure sensitive adhesive. Alternatively, the entirety of the buffer strip may be made of elastic adhesive which retains elasticity even after drying or curing. Further, the strips 15a', 15b' arranged between the panel device 12 and the back lighter 14 may be replaced by a simple adhesive means which has no buffer or shock-absorbing function.

Due to the absence of the engaging pawls, the display shown in FIGS. 8 and 9 is even thinner and lighter than that shown in FIGS. 6 and 7. Further, the absence of the engaging pawls makes the assembling process even easier, so that the manufacturing cost is correspondingly reduced.

Figure 10:
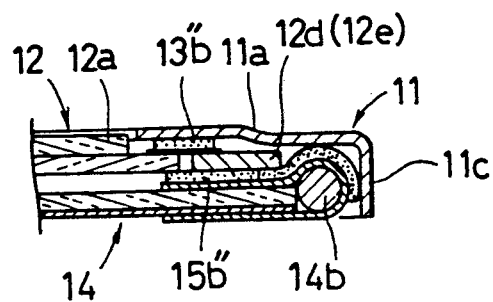
FIG. 10 is a fragmentary sectional view similar to FIG. 9 but showing a slight modification from the arrangement of FIG. 9.
Figure 11:
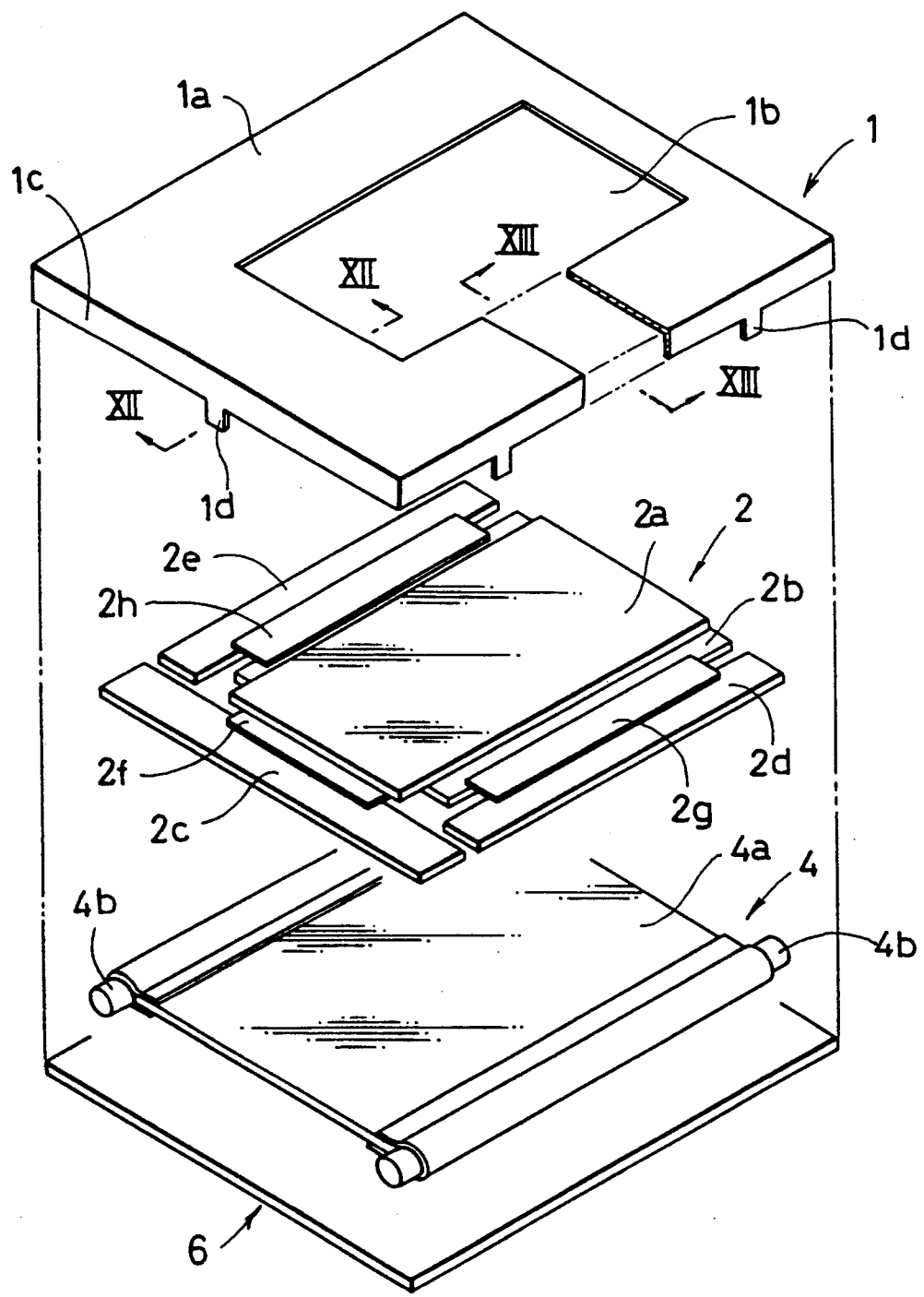
FIG. 11 is an exploded perspective view showing a prior art liquid crystal display.
Figure 12:
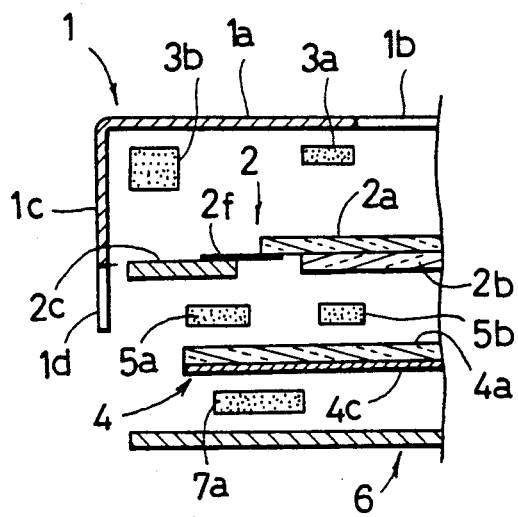
FIG. 12 is a fragmentary sectional view taken along lines XII—XII in FIG. 11.
Figure 13:
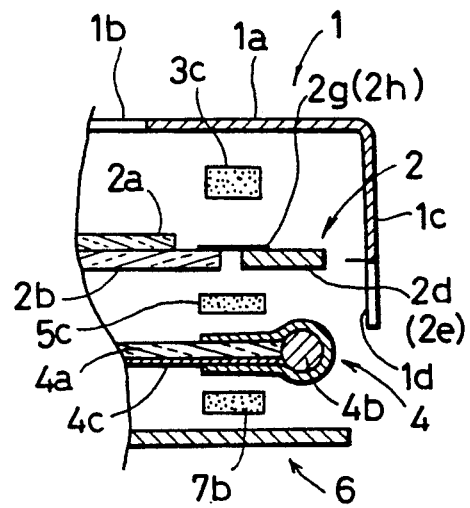
FIG. 13 is a fragmentary sectional view taken along lines XIII—XIII in FIG. 11.
Figure 14:
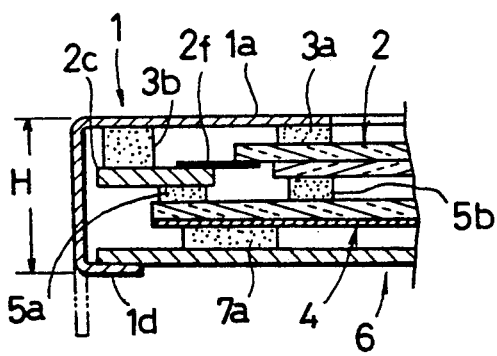
FIG. 14 is a fragmentary sectional view corresponding to FIG. 12 but showing the prior art display in an assembled state.
Figure 15:
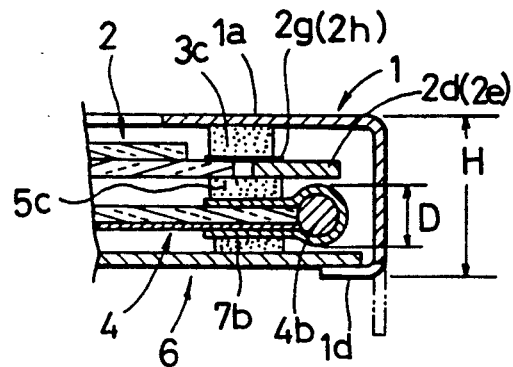
FIG. 15 is a fragmentary sectional view corresponding to FIG. 13 but showing the prior art display in an assembled state.

As shown in FIG. 10, only a strip 15b'' associated with a fluorescent lamp 14b may be rendered wide enough to partially enclose the lamp, and the portion of the strip 15b' enclosing the lamp is adhesively attached to the frame 11. Such an arrangement is preferable because the lamp 14b can be supported against displacing downward under its own weight.

The widened strip 15b'' may comprise an elastic film having both faces coated with pressure sensitive adhesive. Alternatively, the entirety of the widened strip may be made of elastic adhesive which retains elasticity even after drying or curing. Further, the widened strip may be replaced by a simple adhesive means which has no buffer or shock-absorbing function.

The present invention being thus described, it is obvious that the same may be varied in many ways. Such variations are not to be regarded as a departure from the spirit and scope of the invention, and all such modifications as would be obvious to those skilled in the art are intended to be included within the scope of the following claims.

I claim:

1. A liquid crystal display comprising:
    a fixing frame having a front wall formed with a display window, said frame also having a peripheral wall;
    a liquid crystal panel device received in said frame, said panel device having a marginal edge spaced from said peripheral wall of said frame to define an accommodating space between said marginal edge and said peripheral wall; and
    a back lighter received in said frame and stacked to said panel device on the side thereof away from said window for illuminating said panel device from behind, said back lighter including a flat light guide which has at least one marginal edge provided with a cylindrical lamp extending along said marginal edge of said light guide, said light guide having a front surface located closer to said display window and a rear surface located away from said display window, the diameter of the lamp being larger than the thickness of said light guide;
    wherein said lamp is located laterally outwardly of a corresponding edge of said panel device, said lamp being substantially flush with said rear surface of said light guide but projecting beyond said front surface of said light guide in the direction of said front wall,
    wherein said lamp projects into said accommodating space to overlap partially said panel device in the direction of said front wall.

2. The display according to claim 1, wherein said frame has engaging pawls which are bent to fixedly support said panel device and said back lighter relative to said frame.

3. The display according to claim 2, further comprising first buffer means interposed between said frame and said panel device, and second buffer means interposed between said panel device and said back lighter.

4. The display according to claim 2, wherein said engaging pawls are bent to engage directly with said rear surface of said light guide.

5. The display according to claim 2, further comprising a rear lid arranged in facing relation to said rear surface of said light guide, said engaging pawls being bent to engage said rear lid.

6. The display according to claim 5, further comprising first buffer means interposed between said frame and said panel device, second buffer means interposed between said panel device and said back lighter, and third buffer means interposed between said back lighter and said lid.

7. The display according to claim 1, further comprising first bonding means interposed between said frame and said panel device for attachment thereto, and second bonding means interposed between said panel device and said back lighter for attachment thereto, said first bonding means being elastic for providing a buffer function.

8. The display according to claim 7, wherein said first bonding means is adhesively bondable to both of said frame and said panel device.

9. The display according to claim 7, wherein said second bonding means is adhesively bondable to both of said panel device and said back lighter.

10. The display according to claim 9, wherein said second bonding means is also elastic for providing a buffer function.

11. The display according to claim 9, wherein said second bonding means has a portion partially enclosing said lamp, said partially enclosing portion being adhesively bonded directly to said frame.

12. The display according to claim 1, wherein said front plate of said panel device is fitted into said window.

* * * * *